(12) United States Patent
Ito et al.

(10) Patent No.: US 9,327,609 B2
(45) Date of Patent: May 3, 2016

(54) CONTROLLER FOR HYBRID VEHICLE

(71) Applicant: DENSO CORPORATION, Kariya, Aichi-pref. (JP)

(72) Inventors: Yutaro Ito, Kariya (JP); Noriaki Ikemoto, Kariya (JP); Tsuyoshi Okamoto, Kariya (JP); Youhei Morimoto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/503,774

(22) Filed: Oct. 1, 2014

(65) Prior Publication Data

US 2015/0094894 A1 Apr. 2, 2015

(30) Foreign Application Priority Data

Oct. 2, 2013 (JP) .................... 2013-207241

(51) Int. Cl.
*B60L 11/18* (2006.01)
*B60W 10/06* (2006.01)
(Continued)

(52) U.S. Cl.
CPC ............ *B60L 11/1861* (2013.01); *B60H 1/004* (2013.01); *B60L 1/02* (2013.01); *B60L 11/123* (2013.01); *B60L 11/14* (2013.01); *B60W 10/06* (2013.01); *B60W 10/26* (2013.01); *B60W 20/10* (2013.01); *B60L 2210/10* (2013.01); *B60L 2210/40* (2013.01); *B60L 2220/14* (2013.01); *B60L 2240/12* (2013.01); *B60L 2240/34* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/80* (2013.01);

(Continued)

(58) Field of Classification Search
CPC ..... B60W 20/40; B60W 10/06; B60W 10/26; B60W 20/10; B60W 2710/244; B60H 1/18; B60H 1/004; B60L 11/1861; B60L 11/14; B60L 11/123; B60L 1/02; B60L 2220/14; B60L 2240/445; B60L 2240/12; B60L 2250/10; B60L 2240/423; B60L 2240/443; B60L 2250/26; B60L 2240/80; B60L 2210/10; Y10S 903/93; B60Y 2306/07
See application file for complete search history.

(56) References Cited

U.S. PATENT DOCUMENTS 6,059,016 A * 5/2000 Rafalovich ......... B60H 1/00492
165/10
2004/0144084 A1* 7/2004 Hara ..................... B60H 1/025
60/288

(Continued)

FOREIGN PATENT DOCUMENTS

JP H01132415 A * 5/1989
JP 2000203248 A * 7/2000
JP 5206495 3/2013

*Primary Examiner* — Rodney Butler
(74) *Attorney, Agent, or Firm* — Nixon & Vanderhye PC

(57) ABSTRACT

A hybrid vehicle controller controls a start or a stop of an engine according to a heating requirement or an engine-warming requirement. When at least one of the heating requirement and the engine-warming requirement is generated and a state of charge (SOC) of a main battery is higher than a specified threshold, the controller performs an SOC-fall-control to drop an SOC of a main battery. When the SOC of the main battery falls to a specified value, the engine is restarted. Since the engine can be started in a state where the SOC is lower enough than the upper limit by performing the SOC-fall-control, the engine output power can be converted into the heat for heating the passenger compartment or warming-up the engine.

14 Claims, 7 Drawing Sheets

(51) Int. Cl.
*B60H 1/00* (2006.01)
*B60L 1/02* (2006.01)
*B60L 11/12* (2006.01)
*B60W 10/26* (2006.01)
*B60L 11/14* (2006.01)
*B60W 20/00* (2016.01)

(52) U.S. Cl.
CPC .......... *B60L2250/10* (2013.01); *B60L 2250/26* (2013.01); *B60L 2260/26* (2013.01); *B60L 2270/46* (2013.01); *B60W 2710/244* (2013.01); *B60Y 2306/07* (2013.01); *Y02T 10/6217* (2013.01); *Y02T 10/642* (2013.01); *Y02T 10/705* (2013.01); *Y02T 10/7005* (2013.01); *Y02T 10/7044* (2013.01); *Y02T 10/7077* (2013.01); *Y02T 10/7216* (2013.01); *Y02T 10/7241* (2013.01); *Y10S 903/93* (2013.01)

(56) References Cited

U.S. PATENT DOCUMENTS

| | | | |
|---|---|---|---|
| 2005/0188711 A1* | 9/2005 | Wang | B60H 1/00878 62/238.6 |
| 2010/0084112 A1* | 4/2010 | Piccard | B60H 1/004 165/41 |
| 2010/0185349 A1* | 7/2010 | Harada et al. | 701/22 |
| 2011/0004392 A1* | 1/2011 | Senda et al. | 701/102 |
| 2012/0102934 A1* | 5/2012 | Magnetto | F01M 5/001 60/320 |
| 2012/0150374 A1* | 6/2012 | Yamazaki et al. | 701/22 |
| 2013/0099012 A1* | 4/2013 | Roos | B60H 1/20 237/12.3 C |
| 2013/0213600 A1* | 8/2013 | Saitoh | 165/11.1 |
| 2013/0332016 A1* | 12/2013 | Suzuki et al. | 701/22 |
| 2014/0116673 A1* | 5/2014 | Kang | B60H 1/00921 165/222 |

* cited by examiner

CONTROLLER FOR HYBRID VEHICLE

CROSS-REFERENCE TO RELATED APPLICATION

This application is based on Japanese Patent Application No. 2013-207241 filed on Oct. 2, 2013, the disclosure of which is incorporated herein by reference.

TECHNICAL FIELD

The present disclosure relates to a controller for a hybrid vehicle equipped with an engine and a motor-generator. The controller controls a start and a stop of the engine.

BACKGROUND

A hybrid vehicle equipped with an engine and a motor-generator has been developed to reduce emission and improve fuel economy. In the hybrid vehicle, an exhaust heat of the engine is utilized for heating a passenger compartment or warming up the engine. It is known that an electric power generation of the engine is increased when a heating requirement is generated. For example, Japanese patent No. 5206495 shows that a charge and discharge amount of the battery is controlled to decrease a state of charge (SOC) of the battery when a heating requirement is generated.

In the above conventional art, when a heating requirement is generated, the engine is restarted without respect to the SOC of a main battery so as to ensure the heating energy. Furthermore, in order to ensure the heating energy more, the engine needs to generate more output energy corresponding to a load of the main battery in addition to a travelling load. Thus, when the heating requirement is generated in a state where the SOC is relatively high, the SOC reaches an upper limit immediately and the main battery cannot be charged anymore. Then, the engine is driven in a low load in order to ensure the heating energy only. The engine efficiency is deteriorated. Also, since the engine output is small, the engine operating time is prolonged.

SUMMARY

It is an object of the present disclosure to provide a controller for a hybrid vehicle, which is able to improve an engine efficiency of when an engine is started to generate heating energy or warm-up energy.

According to one aspect of the present disclosure, a controller controls a start and a stop of the engine according to a heating requirement or an engine-warming requirement, and performs an SOC-fall-control in which a state of charge of the main battery is lowered when at least one of the heating requirement and the engine-warming requirement is generated and the state of charge of the main battery is higher than a specified threshold. Further, the controller starts the engine when the state of charge of the main battery falls to a specified engine-start state of charge of the main battery.

According to another aspect of the present disclosure, a controller controls a start and a stop of the engine according to a heating requirement or an engine-warming requirement. The controller starts the engine when at least one of the heating requirement and the engine-warming requirement is generated and a state of charge of the main battery is lower than or equal to a specified threshold. The controller stops the engine and performs an SOC-fall-control in which a state of charge of the main battery is lowered, when a state of charge of the main battery reaches an upper limit value. Further the controller re-starts the engine when the state of charge of the main battery falls to a specified engine-start state of charge of the main battery.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Multiple embodiments of the present invention will be described with reference to accompanying drawings.

First Embodiment

Figure 1:
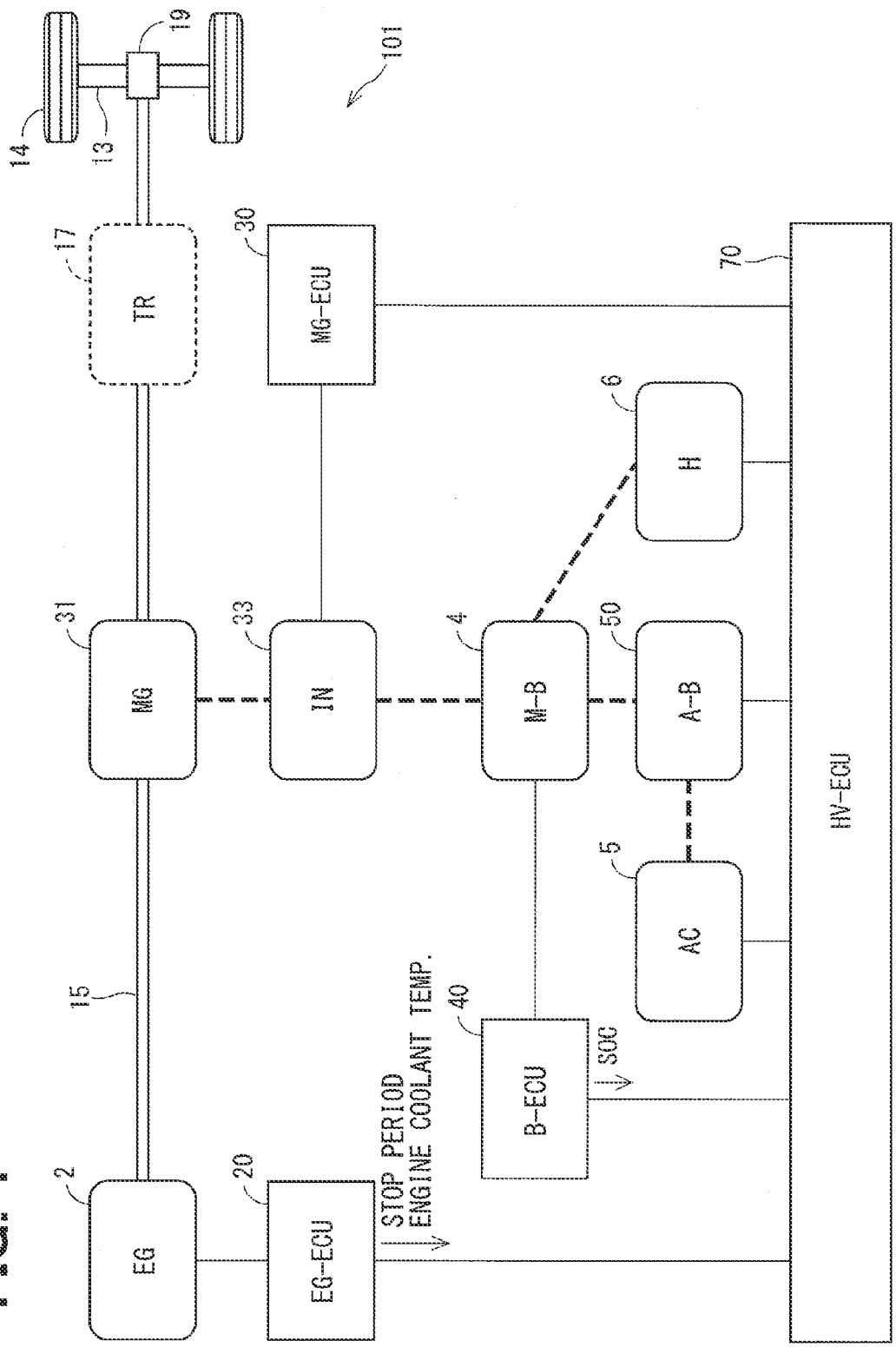
FIG. 1 is a schematic view of a hybrid vehicle system including a controller.

Referring to FIG. 1, a hybrid vehicle system including a controller will be explained, hereinafter. A hybrid vehicle 101 is a parallel hybrid vehicle equipped with an engine 2 and a motor-generator 31 as a driving force source. An HV-ECU 70 as a hybrid vehicle controller controls a driving forces of the engine 2 and the motor-generator 31, so that a driving force of the hybrid vehicle 101 is controlled.

The driving force of the engine 2 is transmitted to the crankshaft 15, and drives the wheel 14 through the deferential gearing system 19 and the axle shaft 13. An engine-ECU 20 obtains information including a crank angle of the crankshaft 15, an engine speed based on a crank angle signal transmitted from a crank angle sensor, so that the engine 2 is controlled. Moreover, the engine-ECU 20 obtains information including an engine-stop period and an engine coolant temperature. Then, the engine-ECU 20 transmits the above information to the HV-ECU 70.

The motor-generator 31 is a three-phase motor of a permanent magnet synchronous type. The motor-generator 31 is electrically connected with the main battery 4 through an inverter 33, which is a power converter converting three-phase alternating current into direct current. The motor-generator 31 operates as an electric motor that consumes electric power charged in the main battery 4 to assist the driving force of the engine 4 for driving the wheel 14. Also, the motor-generator 31 operates as an electric generator that regenerates electric power by receiving the driving force from the engine 2. The generated electric power can be charged in the main battery 4.

An MG-ECU 30 controls an energization of the motor-generator 31 by controlling a switching operation of the inverter 33 based on a torque-command transmitted from the HV-ECU 70 and an electric torque angle signal transmitted from a rotational angle sensor disposed in a vicinity of a rotor of the motor-generator 31. Besides, a DC-DC converter may be provided between the main battery 4 and the inverter 33 in order to increase the direct current of the main battery 4.

Figure 2:
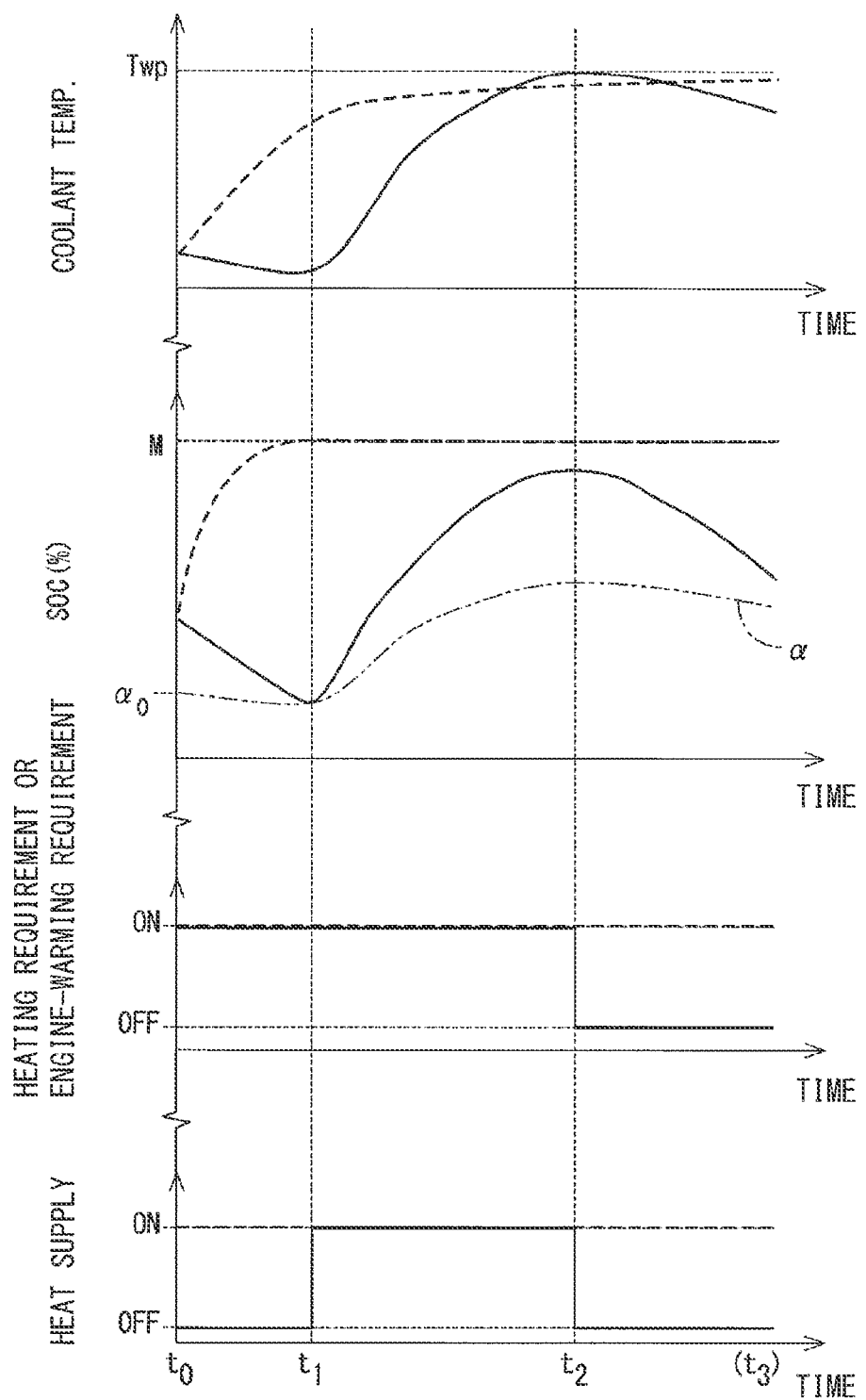
FIG. 2 is a time chart showing an SOC-fall-control according to a first embodiment.

The main battery 4 is a secondary battery made of nickel hydride or lithium, or an electric double layer capacitor. As shown in FIG. 2, the SOC (State of Charge: charging rate) of the main battery 4 is an upper limit "M" or less. A battery-ECU 40 monitors the SOC of the main battery 4, and transmits the information of the SOC to the HV-ECU 70.

The direct current electric power of the main battery 4 is inverted into three-phase alternating current electric power by the inverter 33. Further, the direct current electric power of the main battery 4 is converted into direct current electric power of low voltage by a DC-DC converter to be used as an electric power source for an accessory battery 50 or an electric heater 6. The accessory battery 50 supplies electric power to various auxiliary components 5, such as a fan, a blower, a pump and the like. The electric heater 6 is for heating a passenger compartment with electric energy. The electric heater 6 includes a heat pump, a PTC heater, and a sheet heater.

The HV-ECU 70 receives an accelerator signal from an accelerator sensor, a brake signal from a brake switch, a shift signal from a shift switch, a vehicle speed signal and the like. Based on the received signals, the HV-ECU 70 totally judges a driving condition of a vehicle. The HV-ECU 70 communicates information between the engine-ECU 20, the MG-ECU 30, and the battery-ECU 40, whereby the driving forces of the engine 2 and the motor-generator 31 and the charge and discharge of the main battery 4 are totally controlled.

In the above hybrid vehicle 101, the exhaust heat of the engine 2 is utilized for heating a passenger compartment or warming-up the engine 2. The HV-ECU 70 has a function that the engine 2 is started or stopped according to a heating requirement or an engine-warming requirement. The HV-ECU 70 performs following controls which will be described in detail hereinafter.

Figure 3:
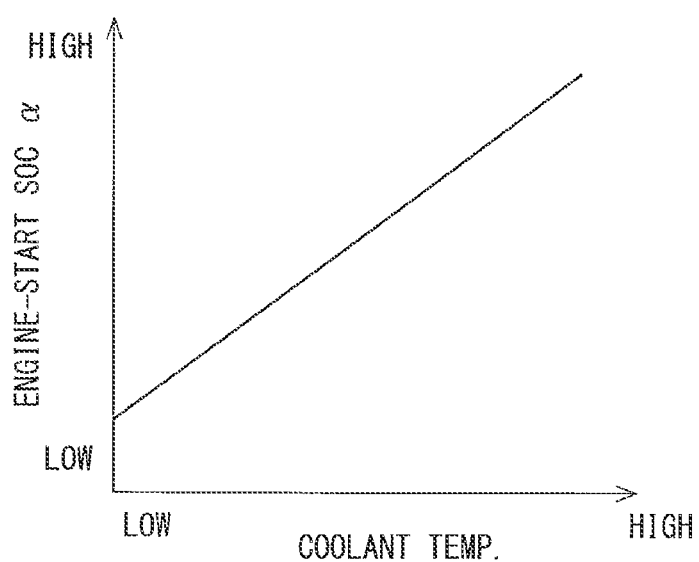
FIG. 3 is a graph showing a relationship between an engine coolant temperature and an SOC.

Referring to FIGS. 2 and 3, a SOC-fall-control will be described. FIG. 2 is a time chart of which horizontal axis represents elapsed time and of which vertical axis represents an engine coolant temperature, an SOC of the main battery 4, a heating requirement or an engine-warming requirement, and a heat supply, respectively. In FIG. 2, dashed lines show characteristics of the conventional art and solid lines show characteristics of the present embodiment.

When the heating requirement or the engine-warming requirement is generated at a time t0, the SOC of the main battery 4 is greater than a threshold $\alpha 0$. The threshold $\alpha 0$ is equivalent to an "engine-start SOC" determined based on the engine-coolant temperature at a time t0. The engine-start SOC will be described later. It should be noted that the threshold $\alpha 0$ may be established based on the engine coolant temperature obtained before the time t0, due to a time lag of control calculation.

In the conventional art, when the heating requirement or the engine-warming requirement is generated, the engine is started without respect to the SOC. Thus, the SOC promptly rises and the engine coolant temperature also rises. When the SOC reaches an upper limit "M" immediately after that, it becomes impossible to charge the main battery 4. Thus, it becomes necessary to drive the engine 2 only for generating heat for the passenger compartment heating or the engine warming-up. Thus, the engine efficiency is deteriorated. Also, since the engine output is small, the engine operating time is prolonged.

On the other hand, according to the present embodiment, when the SOC is greater than the threshold $\alpha 0$, the HV-ECU 70 discharges the main battery 4 to drop the SOC without promptly starting the engine 2. Before the engine 2 is started, the engine-coolant temperature is decreased. Then, when the SOC falls to the engine-start SOC$\alpha$ at a time t1, the engine 2 is started to generate heat. The motor-generator 31 is driven by the driving force of the engine 2, so that the SOC rises. Also, the engine-coolant temperature rises. If the engine-coolant temperature reaches an intermittent-operation-coolant-temperature Twp at the time t2, the heating requirement or then engine-warming requirement is terminated to stop the engine 2. Thereafter, the SOC continues falling until a time t3. Also, the engine-coolant temperature gradually falls.

The engine-start SOC$\alpha$ is a threshold for determining an engine start timing, which is established based on a current engine-coolant temperature, as shown in FIG. 3. That is, when the engine-coolant temperature is relatively low, the engine-start SOC$\alpha$ is set relatively low in order to ensure an increasing amount of the SOC relative to the upper limit. Meanwhile, when the engine-coolant temperature is relatively high, the increasing amount of the SOC relative to the upper limit may be small low, whereby the engine-start SOC$\alpha$ is set relatively high. Therefore, as shown in FIG. 2, the engine-start SOC$\alpha$ shown by a dashed line reflects the engine-coolant temperature. In FIG. 3, the engine-start SOC$\alpha$ is linear with respect to the engine-coolant temperature. However, the engine-start SOC$\alpha$ may not be always linear with respect to the engine-coolant temperature. The current engine-coolant temperature corresponds to a substantial current engine-coolant temperature in view of the time lag of control calculation.

In the above described SOC-fall-control, the SOC of the main battery 4 is lowered when the engine 2 is stopped. Furthermore, during a period between the time t1 and the time t2 in FIG. 2, the rising of the SOC of the main battery 4 is restricted.

The SOC-fall-control is one of a charge-discharge-variable change processing which HV-ECU 70 performs. Next, referring to a flowchart shown in FIG. 4, the charge-discharge-variable change processing will be described hereinafter.

It should be noted that a charge-discharge-variable is a general term representing an operation amount for charging and discharging the main battery 4, which includes an electric power generation by an engine, a discharging amount, and an electric power consumption by auxiliary components. The electric power generation by an engine is an electric power generation which the motor-generator 31 generates with the driving force of the engine 2. The discharging amount is a discharging amount of the main battery 4. The electric power consumption by auxiliary components is power consumption of auxiliary components to which an electric power is directly or indirectly supplied from the main battery 4.

Figure 4:
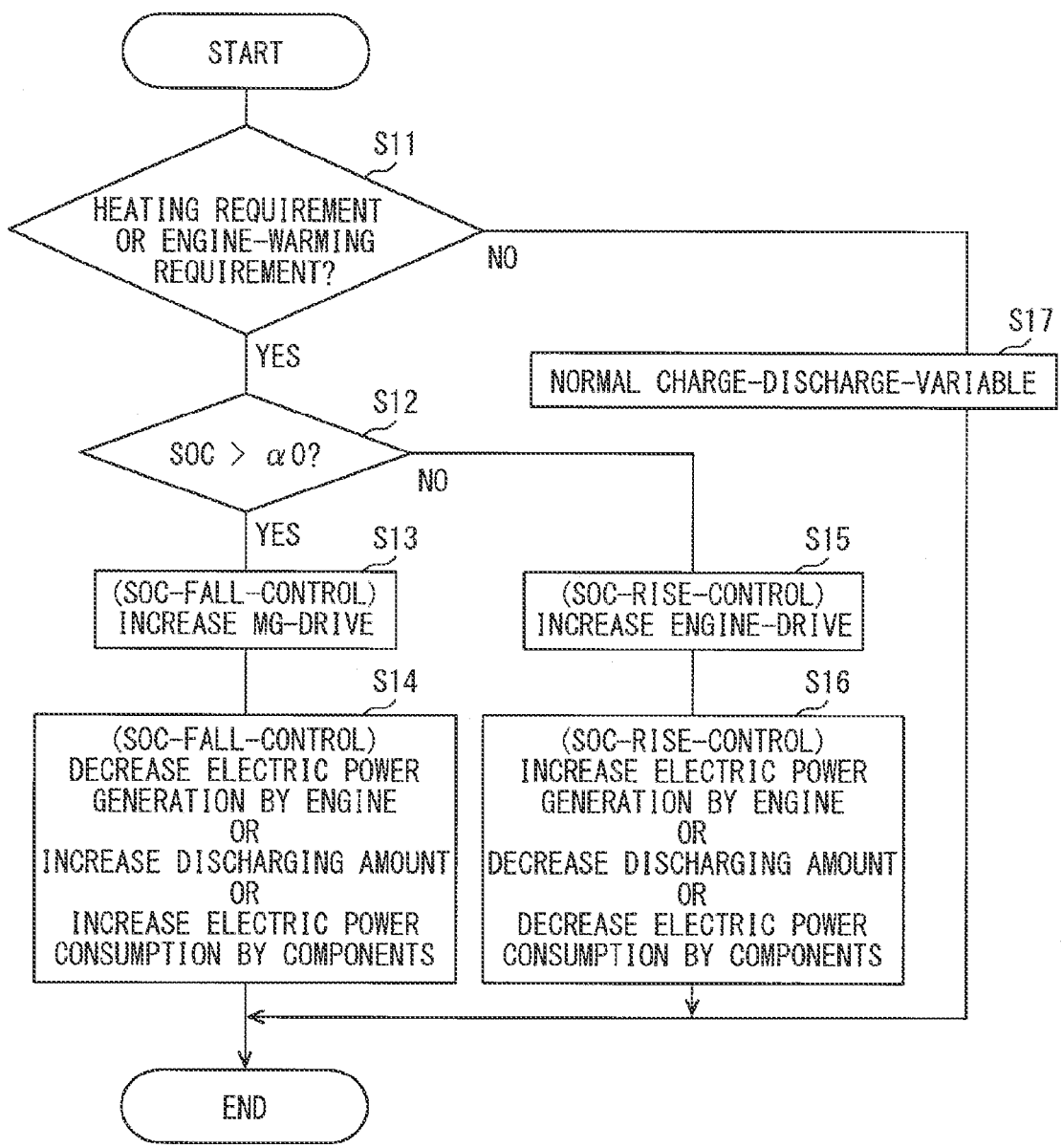
FIG. 4 is a flow chart showing a charge-discharge-variable change processing according to the first embodiment.

The HV-ECU 70 determines a start or a stop of the engine 2, the electric power generation by an engine, and the discharging amount, according to the flowchart shown in FIG. 4. In S11, the HV-ECU 70 determines whether at least one of the heating requirement and the engine-warming requirement is generated. When the answer is NO in S11, the procedure proceeds to S17 in which the normal charge-discharge-variable is maintained with no heating requirement and no engine-warming requirement. When the answer is YES in S11, the procedure proceeds to S12 in which the HV-ECU 70 compares the SOC of the main battery 4 with the a threshold $\alpha 0$.

When the SOC is greater than the threshold $\alpha 0$ (S12: YES), the SOC-fall-control is performed to decrease the SOC or restrict an increase of the SOC. In S13, the rate of the driving force generated by the motor-generator 31 relative to a total driving force of a vehicle is increased. A frequency of an EV-driving is increased. In S14, the HV-ECU 70 decreases the electric power generation by the engine, increases the discharging amount, or increases the electric power consumption by the auxiliary components. These processes may be combined, or one of these may be performed. Moreover, the process in S14 may be performed earlier than the process in S13.

Meanwhile, when the SOC is less than or equal to the threshold α0 (S12: NO), an SOC-rise-control is performed. In S15, the rate of the driving force generated by the engine 2 relative to a total driving force of a vehicle is increased. The frequency of the EV-driving is decreased. In S16, the HV-ECU 70 increases the electric power generation by the engine, decreases the discharging amount, or decreases the electric power consumption by the auxiliary components. These processes may be combined, or one of these may be performed. Moreover, the process in S16 may be performed earlier than the process in S15. The charge-discharge-variable can be set according to a conventional manner. Alternatively, the threshold may be changed to set the charge-discharge-variable.

As described above, the HV-ECU 70 determines whether the engine 2 is started or not and whether the SOC is increased or decreased based on the SOC at a time when the heating requirement or the engine-warming requirement is generated. Especially, according to the present embodiment, when the SOC is greater than the threshold α0, the SOC-fall-control is performed to drop the SOC to the engine-start SOCα.

Since the engine 2 can be started in a state where the SOC is lower enough than the upper limit "M" by performing the SOC-fall-control, the engine output power can be converted into the heat for heating the passenger compartment or warming-up the engine. Moreover, since the engine 2 is continuously driven under the higher load than usual, the engine operating time can be shortened. Thus, the engine efficiency can be enhanced.

Figure 5:
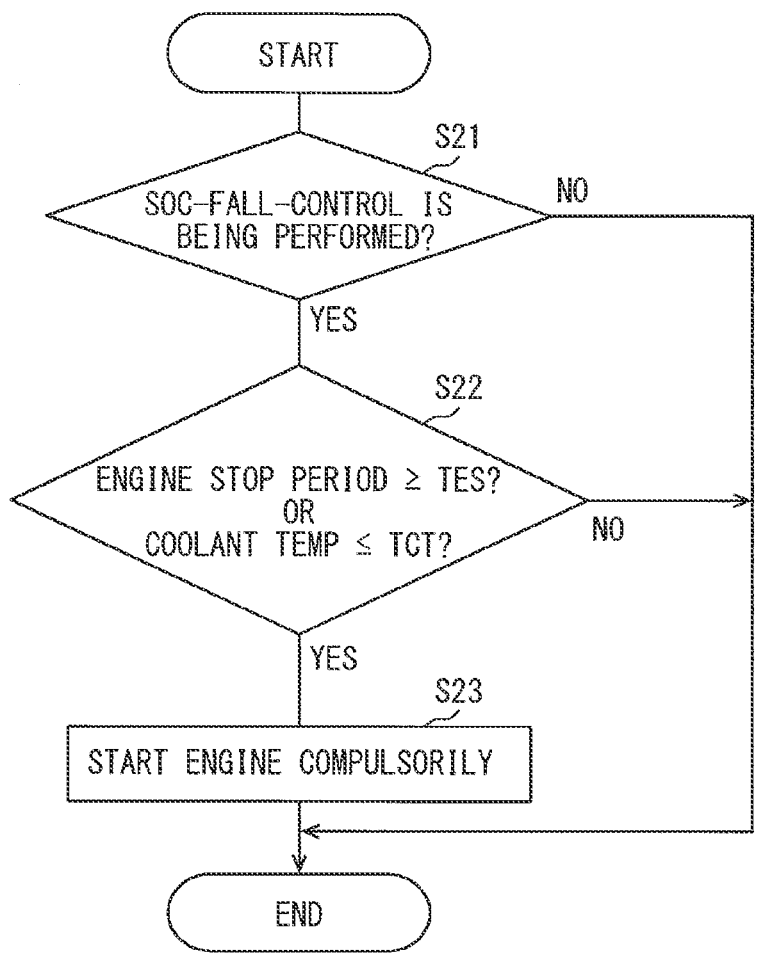
FIG. 5 is a flowchart showing an engine compulsive start-up processing according to the first embodiment.

Then, referring to a flowchart shown in FIG. 5, an engine compulsive start-up processing will be explained, which is exceptionally performed during the SOC-fall-control.

In S21, the HV-ECU 70 determines whether the SOC-fall-control is being performed. When the answer is YES, the HV-ECU 70 receives signals indicative of the engine stop period and the engine-coolant temperature from the engine-ECU 20. In S22, the HV-ECU 70 determines whether the engine stop period is longer than or equal to a specified time period TES and whether the engine-coolant temperature is less than or equal to a specified temperature TCT. When the answer is YES in S22, the procedure proceeds to S23 in which the HV-ECU 70 compulsorily starts the engine 2.

When the engine stop period is longer than or equal to a specified time period TES, it is estimated that the SOC-fall-control cannot be performed because the vehicle is stopped. When the engine-coolant temperature is less than or equal to a specified temperature TCT, it is estimated that the engine coolant temperature falls remarkably because an ambient temperature is low. In such cases, the engine is immediately started to perform the heating in a passenger compartment.

Second Embodiment

Figure 6:
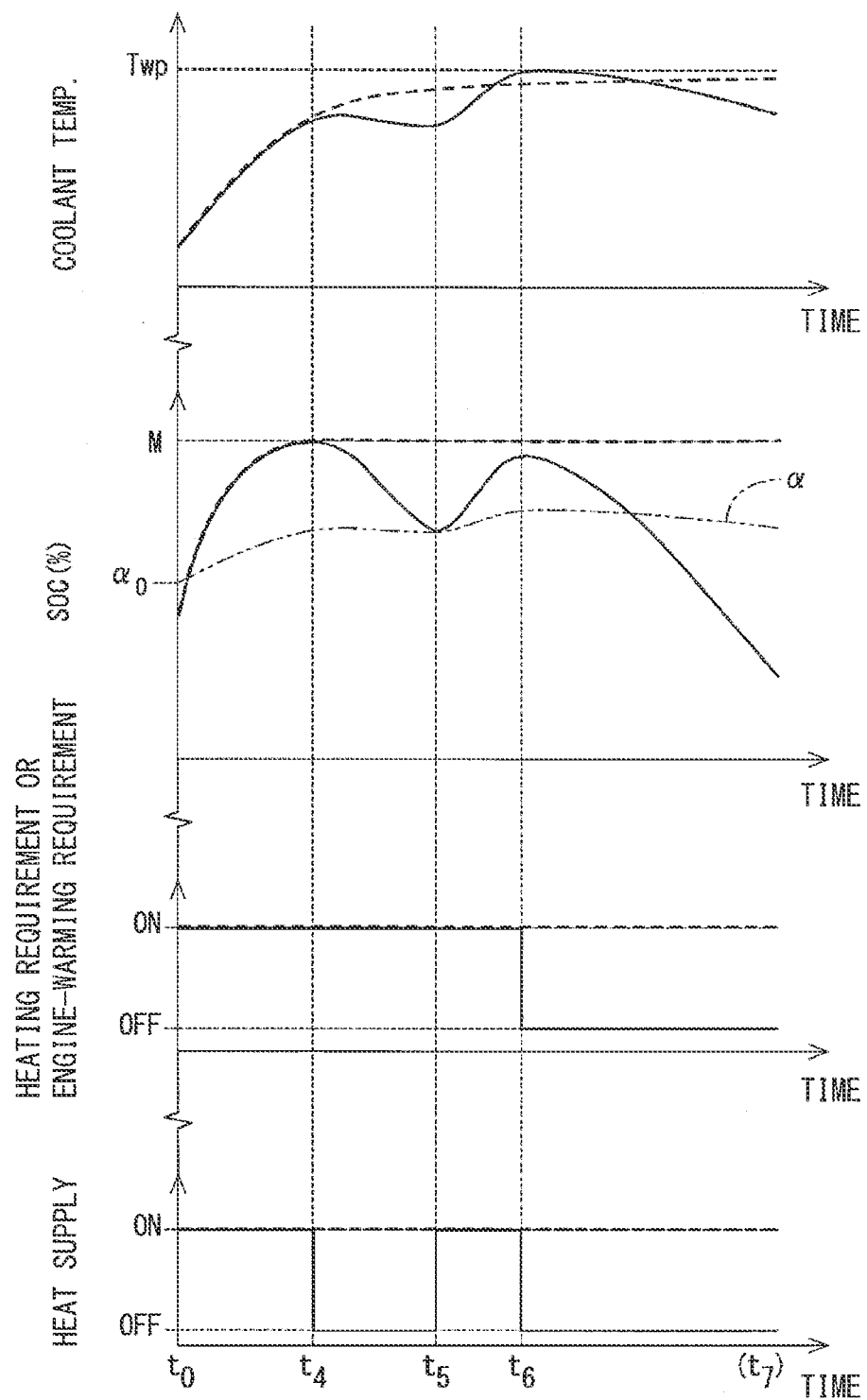
FIG. 6 is a time chart showing an SOC-fall-control according to a second embodiment.

Referring to FIG. 6, an SOC-fall-control of a second embodiment will be described. In FIG. 6, dashed lines show characteristics of the conventional art that is the same as those shown in FIG. 2.

When the heating requirement or the engine-warming requirement is generated at the time t0, the SOC of the main battery 4 is less than or equal to the threshold α0. The HV-ECU 70 starts the engine 2 and performs the heat supply. Thus, the engine-coolant temperature rises.

Then, when the SOC reaches the upper limit "M" at a time t4, the HV-ECU 70 stops the engine 2 and starts the SOC-fall-control. Since the heat supply is stopped at this time, the engine-coolant temperature falls. Then, when the SOC falls to the engine-start SOCα at a time t5, the engine 2 is re-started to generate heat. The SOC rises by the electric power generation by the engine 2. When the engine-coolant temperature reaches the intermittent-operation-coolant-temperature Twp at the time t6, the heating requirement or the engine-warming requirement is terminated to stop the engine 2. Thereafter, the SOC continues falling until a time t7. Also, the engine-coolant temperature gradually falls.

According to the second embodiment as described above, when the SOC is less than the threshold α with the heating requirement or the engine-warming requirement and then the SOC reaches the upper limit "M", the SOC-fall-control is performed. Therefore, the engine 2 is started to efficiently ensure the heat for heating and warming-up of the engine 2. Further, the charge-discharge-variable change processing shown in FIG. 4 and the engine compulsive start-up process shown in FIG. 5 are performed also in the second embodiment.

Other Embodiments (A) FIG. 1 shows an embodiment of a hybrid vehicle system to which the hybrid vehicle controller is applied. In FIG. 1, as shown by dashed line, a transmission 17 may be provided between the motor-generator 31 and the deferential gear mechanism 19. The transmission 17 may be provided with a clutch. Alternatively, a clutch may be provided between the engine 2 and the motor-generator 31. Moreover, it is not always necessary to provide the auxiliary components 5, the accessory battery 50, and the electric heater 6.

Figure 7:
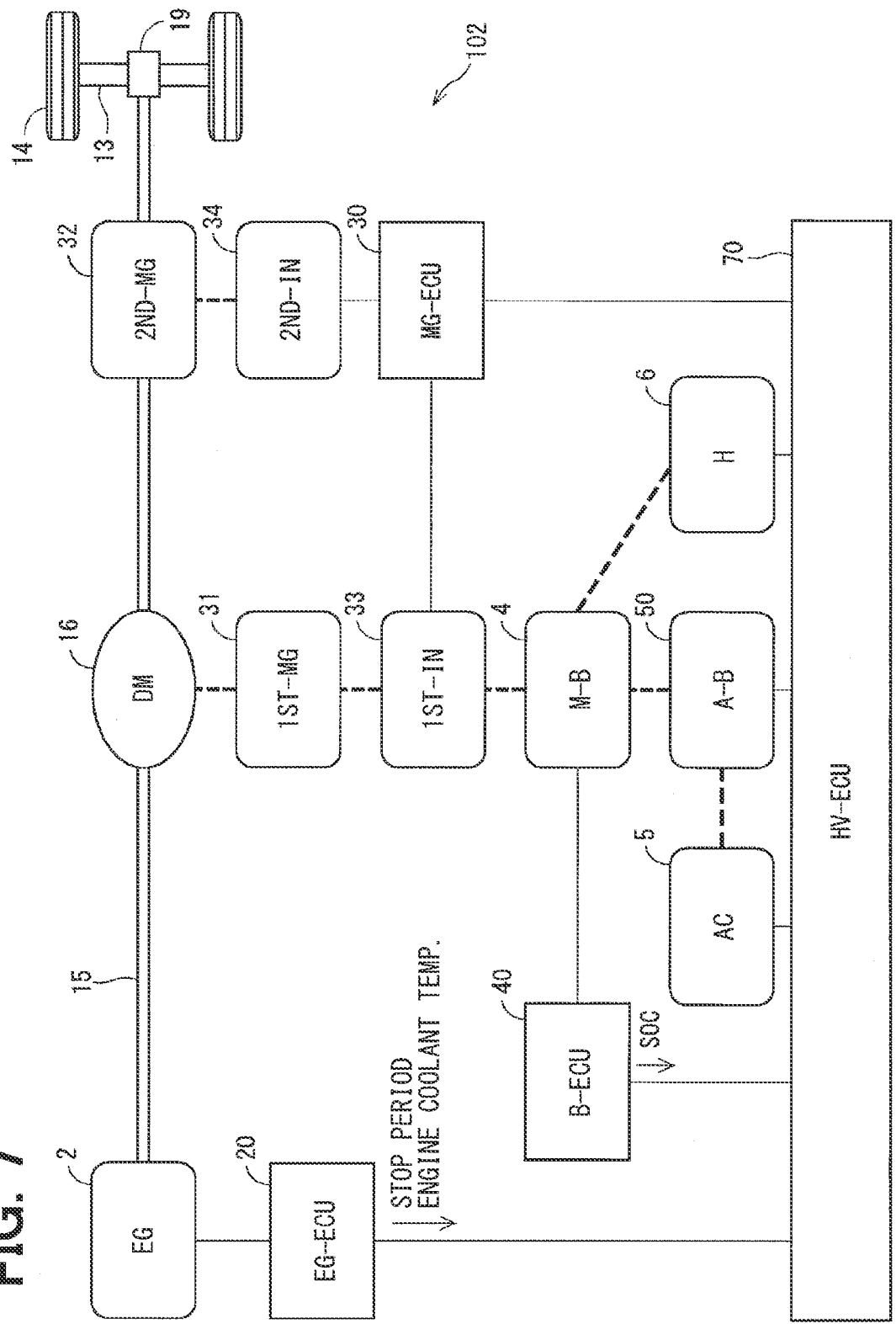
FIG. 7 is a schematic view of another hybrid vehicle system including a controller.

(B) Referring to FIG. 7, another hybrid vehicle system including the controller will be explained, hereinafter. A hybrid vehicle 102 is a series-parallel hybrid vehicle equipped with an engine 2 and two motor-generators 31, 32 as a driving force source. The first motor-generator 31 is driven by a first inverter 33, and functions as an electric generator mainly generated by the driving force of the engine 2. The second motor-generator 32 is driven by a second inverter 33, and functions as an electric motor driving the wheel 14 through the axle shaft 13.

The driving force of the engine 2 is transmitted to a drive division mechanism 16 through the crankshaft 15. The drive division mechanism 16 divides the driving force of the engine 2 into two forces. One of forces drives the wheel 14, and another drives the first motor-generator 31 to generate electric power. Based on command signals from the HV-ECU 70, the MG-ECU 30 controls the energization of the first motor-generator 31 and the second motor-generator 32 by switching the first inverter 33 and the second inverter 34. The substantially same parts and the components as the first embodiment are indicated with the same reference numeral and the same description is not reiterated.

(C) In the present disclosure, when the SOC falls to the engine-start SOCα, the engine 2 is not started. It means that the electricity is not positively generated by the driving force of the engine 2. Therefore, while the SOC is falling, the engine 2 can be driven temporarily.

That is, when at least one of the heating requirement and the engine-warming requirement is generated, the engine 2 can be temporarily driven as long as the engine 2 is not positively driven until the SOC falls to the engine-start SOCα.

(D) The engine-start SOCα is determined based on the current engine coolant temperature. Alternatively, the engine-start SOCα may be a fixed value. With this, the control computation can be made simple.

The present disclosure is not limited to the embodiments mentioned above, and can be applied to various embodiments.

What is claimed is:

1. A controller for a hybrid vehicle equipped with an engine, a motor-generator generating an electric power with a driving force of the engine, a main battery charging the electric power which the motor-generator generates, and an electric heater for heating a passenger compartment, the main battery discharging the electric power to the motor-generator and the electric heater, wherein an exhaust heat of the engine is utilized for heating the passenger compartment or warming-up the engine, the controller comprising:
a portion controlling a start and a stop of the engine according to a heating requirement;
a portion performing an SOC-fall-control in which a state of charge of the main battery is lowered when the heating requirement is generated and the state of charge of the main battery is higher than a specified threshold; and
a portion starting the engine when the state of charge of the main battery falls to a specified engine-start state of charge of the main battery, wherein
when the SOC-fall-control is performed, the electric heater is energized for heating the passenger compartment without starting the engine, and
when the state of charge of the main battery falls to the specified engine-start-state of charge of the main battery, the engine is started for heating the passenger compartment in cooperation with the electric heater.

2. A controller for a hybrid vehicle equipped with an engine, a motor-generator generating an electric power with a driving force of the engine, a main battery charging the electric power which the motor-generator generates, and an electric heater for heating a passenger compartment, the main battery discharging the electric power to the motor-generator and the electric battery, wherein an exhaust heat of the engine is utilized for heating the passenger compartment or warming-up the engine, the controller comprising:
a portion controlling a start and a stop of the engine according to a heating requirement;
a portion starting the engine when the heating requirement is generated and a state of charge of the main battery is lower than or equal to a specified threshold;
a portion stopping the engine and performing an SOC-fall-control in which a state of charge of the main battery is lowered, when a state of charge of the main battery reaches a upper limit value; and a portion re-starting the engine when the state of charge of the main battery falls to a specified engine-start state of charge of the main battery, wherein
when the SOC-fall-control is performed, the electric heater is energized for heating the passenger compartment without starting the engine, and
when the state of charge of the main battery falls to the specified engine-start-state of charge of the main battery, the engine is started for heating the passenger compartment in cooperation with the electric heater.

3. A controller for a hybrid vehicle according to claim 1, wherein
the specified engine-start state of charge is determined based on a current engine coolant temperature.

4. A controller for a hybrid vehicle according to claim 3, wherein
the specified threshold is determined based on an engine coolant temperature of when the heating requirement is generated.

5. A controller for a hybrid vehicle according to claim 1, wherein
the SOC-fall-control includes a control which restricts a rise of the state of charge of the main battery.

6. A controller for a hybrid vehicle according to claim 5, wherein
a rate of the driving force generated by the motor-generator relative to a total driving force is increased in the SOC-fall-control.

7. A controller for a hybrid vehicle according to claim 5, wherein
an electric power generation which the motor-generator generates with the driving force of the engine is decreased in the SOC-fall-control.

8. A controller for a hybrid vehicle according to claim 5, wherein
a discharging amount of the main battery is increased in the SOC-fall-control.

9. A controller for a hybrid vehicle according to claim 5, wherein
a power consumption of auxiliary components to which an electric power is directly or indirectly supplied from the main battery is increased in the SOC-fall-control.

10. A controller for a hybrid vehicle according to claim 1, wherein
the engine is compulsorily started when an engine stop period is longer than or equal to a specified time period while the SOC-fall-control is performed.

11. A controller for a hybrid vehicle according to claim 1, wherein
the engine is compulsorily started when an engine-coolant temperature is less than or equal to a specified temperature while the SOC-fall-control is performed.

12. A controller for a hybrid vehicle equipped with an engine, a motor-generator generating an electric power with a driving force of the engine, and a main battery charging the electric power which the motor-generator generates, the main battery discharging the electric power to the motor-generator, wherein an exhaust heat of the engine is utilized for heating a passenger compartment or warming-up the engine, the controller comprising:
a portion controlling a start and a stop of the engine according to a heating requirement;
a portion performing an SOC-fall-control in which a state of charge of the main battery is lowered when the heating requirement is generated and the state of charge of the main battery is higher than a specified threshold;
a portion starting the engine when the state of charge of the main battery falls to a specified engine-start state of charge of the main battery, wherein
the SOC-fall-control includes a control which restricts a rise of the state of charge of the main battery; and
a rate of the driving force generated by the motor-generator relative to a total driving force is increased in the SOC-fall-control.

13. A controller for a hybrid vehicle equipped with an engine, a motor-generator generating an electric power with a driving force of the engine, and a main battery charging the electric power which the motor-generator generates, the main battery discharging the electric power to the motor-generator, wherein an exhaust heat of the engine is utilized for heating a passenger compartment or warming-up the engine, the controller comprising:

a portion controlling a start and a stop of the engine according to a heating requirement;

a portion performing an SOC-fall-control in which a state of charge of the main battery is lowered when the heating requirement is generated and the state of charge of the main battery is higher than a specified threshold;

a portion starting the engine when the state of charge of the main battery falls to a specified engine-start state of charge of the main battery, wherein the SOC-fall-control includes a control which restricts a rise of the state of charge of the main battery; and an electric power generation which the motor-generator generates with the driving force of the engine is decreased in the SOC-fall-control.

14. A controller for a hybrid vehicle equipped with an engine, a motor-generator generating an electric power with a driving force of the engine, and a main battery charging the electric power which the motor-generator generates, the main battery discharging the electric power to the motor-generator, wherein an exhaust heat of the engine is utilized for heating a passenger compartment or warming-up the engine, the controller comprising:

a portion controlling a start and a stop of the engine according to a heating requirement;

a portion performing an SOC-fall-control in which a state of charge of the main battery is lowered when the heating requirement is generated and the state of charge of the main battery is higher than a specified threshold;

a portion starting the engine when the state of charge of the main battery falls to a specified engine-start state of charge of the main battery, wherein the SOC-fall-control includes a control which restricts a rise of the state of charge of the main battery; and a power consumption of auxiliary components to which an electric power is directly or indirectly supplied from the main battery is increased in the SOC-fall-control.

* * * * *